UNITED STATES PATENT OFFICE.

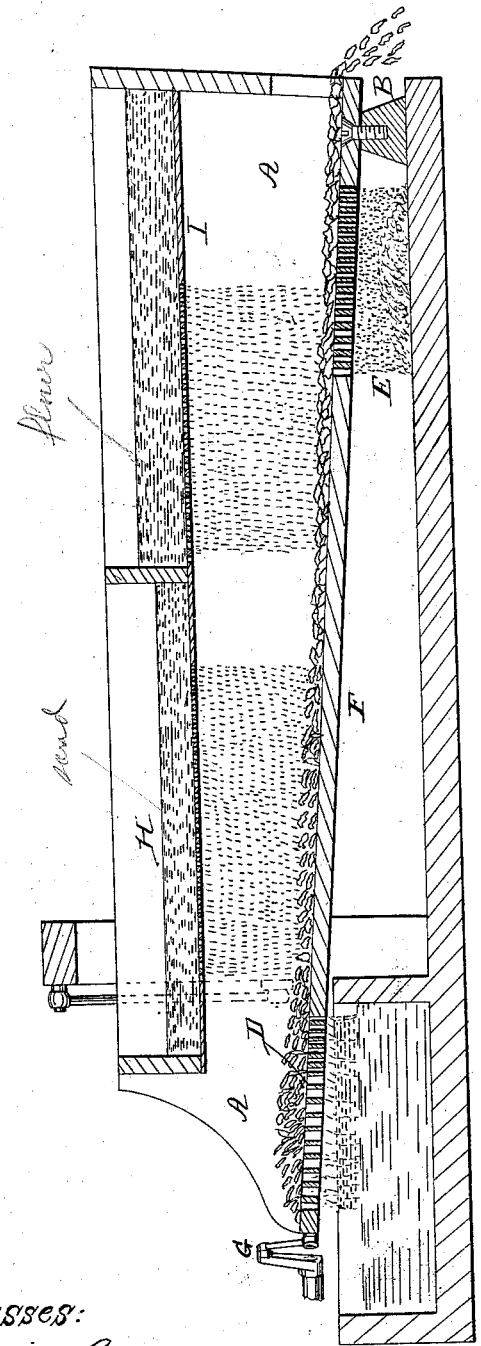

WM. BLESSING, OF WASHINGTON, ASSIGNOR TO HIMSELF AND HORATIO B. MAYNARD, OF WASHINGTON, OHIO.

IMPROVED METHOD OF PREPARING COTTON-SEED FOR PLANTING.

Specification forming part of Letters Patent No. 56,140, dated July 3, 1866.

*To all whom it may concern:*

Be it known that I, WILLIAM BLESSING, of Washington, Fayette county, Ohio, have invented a new and useful Mode of Preparing Cotton-Seed for Planting; and I do hereby declare the following to be a full, clear, and exact description thereof, reference being had to the accompanying drawing, making part of this specification.

My invention relates to a mode of preparing cotton-seed which enables it to be sowed or planted as easily as Indian corn or other naturally smooth seed, the invention being particularly designed to facilitate the planting of cotton-seed by automatic machinery.

The drawing is a longitudinal section of a machine of the kind employed in my process.

I take cotton-seed as it comes from the gin and wet it in a thin solution of glue, gum-arabic, or other suitable glutinous or mucilaginous substance. The solution actually used by me has been one pound of glue to four gallons of water.

The above wetting may be effected by plunging the seed into a vat containing the solution, and afterward draining off the superfluous moisture. While still wet the seeds are placed upon a suitable shaking shoe, such as that represented.

Let A represent a shoe, somewhat similar to that used in separating grain, about two feet wide and about ten feet long, set at a slight declination, its lower end resting upon a pivot, B, its upper end suspended by links or rods C, its floor composed, near its upper and lower ends, respectively, of wire sieves D and E, separated by an imperforate metallic or wooden middle portion, F.

Let G represent a crank linked to the upper end of the shoe, to which it imparts a violent lateral vibration.

Let H represent a sieve containing sand, such as that used in the manufacture of fine sand-paper, and let I represent a sieve containing wheaten or other flour.

The operation is as follows: The wet seed being deposited on the sieve D parts with its superfluous moisture upon or through the said sieve, and being carried along the surface of the sieve to the imperforate portion F, is there sprinkled by the sand which descends from the sieve H. The triturating action of the sand and shoe soon causes the seeds to separate from each other, and to pass in such separate condition underneath the sieve I, the contents from which cling to the wet and sandy surface of the seeds, and become, by triturating action, converted into a pasty cuticle or covering, which, when dry, holds the sand and filaments firmly and closely down upon the body of the seed, so as to give it a smooth, hard, and sound exterior.

The sieve E serves to separate all surplus sand and meal. The seed, after its discharge from the shoe, is spread out in the sun to dry.

The sand, besides acting to separate the individual seeds, serves the additional useful purpose of adding to their weight, which causes them, in the act of planting, to descend with more freedom, promptness, and accuracy to their places in the ground.

In order to clearly illustrate my process a specific form of machine was necessarily selected. I do not, however, propose to restrict myself to any particular mechanical contrivance.

I claim herein as new and of my invention—

The mode of preparing cotton-seed for planting by the application of mucilage, sand, and flour, or their equivalents, substantially as and for the purposes set forth.

In testimony of which invention I hereunto set my hand.

WM. BLESSING.

Witnesses:
 JAMES H. LAYMAN,
 GEO. B. NICHOLSON.